No. 861,195.
PATENTED JULY 23, 1907.
A. W. SHANK.
DUST PAN.
APPLICATION FILED JAN. 26, 1906.
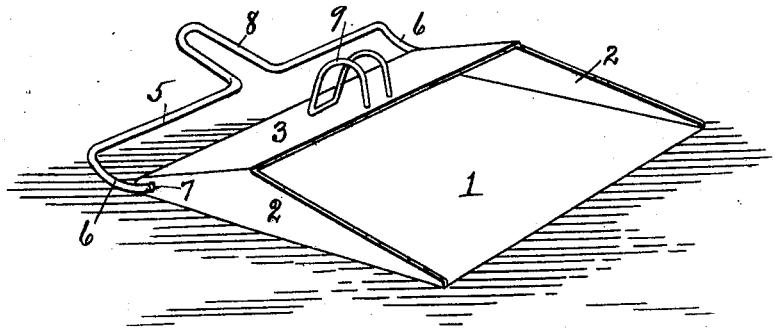
Fig.1.
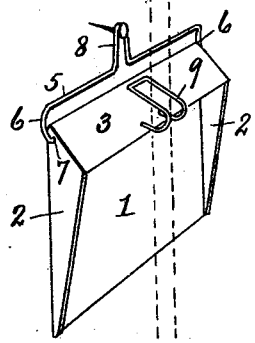
Fig.2.
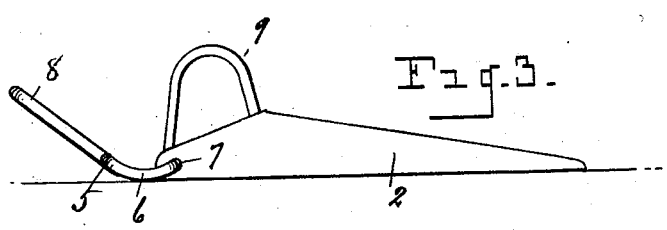
Fig.3.
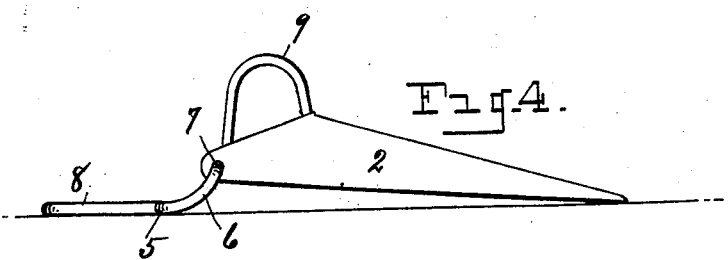
Fig.4.
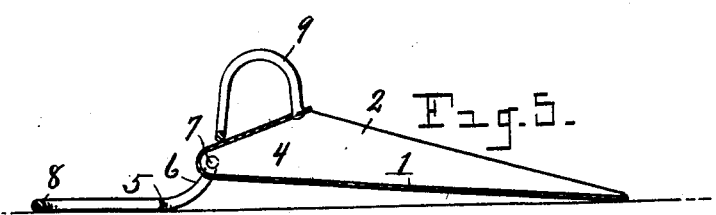
Fig.5.
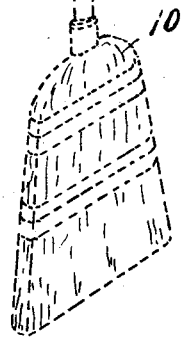
Witnesses.
O. B. Baenziger.
J. G. Howlett.
Inventor.
Augustus W. Shank.
By T. S. Wheeler & Co. Attorneys.

UNITED STATES PATENT OFFICE.

AUGUSTUS W. SHANK, OF DETROIT, MICHIGAN, ASSIGNOR OF ONE-HALF TO CHRISTOPHER C. MOON, OF DETROIT, MICHIGAN.

DUST-PAN.

No. 861,195.　　　　　　Specification of Letters Patent.　　　　　Patented July 23, 1907.

Application filed January 26, 1906. Serial No. 297,946.

*To all whom it may concern:*

Be it known that I, AUGUSTUS W. SHANK, a citizen of the United States, residing at Detroit, in the county of Wayne, State of Michigan, have invented certain new and useful Improvements in Dust-Pans; and I do declare the following to be a full, clear, and exact description of the invention, such as will enable others skilled in the art to which it appertains, to make and use the same, reference being had to the accompanying drawings, and to the figures of reference marked thereon, which form a part of this specification.

This invention relates to new and useful improvements in dust pans, and consists in the construction and arrangement of parts hereinafter fully set forth and pointed out particularly in the claim.

The object of the invention is to provide a dust pan of simple and inexpensive construction in which the arrangement is such that by stepping upon a rearwardly extending bail, the pan may be firmly held in place so as to permit both hands to be used in sweeping, and at the same time the rear of the pan will be elevated so as to cause the front edge to lie closely to the floor, enabling the dirt to be readily swept into the pan. The above object is attained by the structure illustrated in the accompanying drawing, in which:—

Figure 1 is a perspective view of a pan involving my invention. Fig. 2 is a perspective view of the pan hung up, when not in use, showing by dotted lines the manner in which a broom may be supported between the spring sides of the handle of the pan. Fig. 3 is an elevation of the pan in its normal position. Fig. 4 is an elevation, showing the position of the pan when the foot is placed upon the rearwardly extending loop of the bail. Fig. 5 is a central sectional view through the pan in the position shown in Fig. 4.

Referring to the characters of reference. 1 designates the bottom of the pan and 2 the angular side pieces which rise above the bottom and are joined at their rear ends by the inclined top piece 3, said side and top piece in conjunction with the bottom forming a dust pocket 4 in which the dust may be confined that is swept into the pan.

Projecting rearwardly from the pan is a lifting bail 5 having the end portions 6 which stand practically at right angles to the bail and are curved downwardly in the arc of a circle, the terminals of said curved portions being bent inwardly, as shown at 7, to form engaging hooks which are pivotally secured in the rear ends of the sides 2. Extending rearwardly from the central portion of the bail is a loop 8.

When the pan is placed upon the floor, it will lie in the position shown in Figs. 1 and 3 with the loop of the bail raised. By forcing said loop portion downwardly onto the floor, the curved end portion 6 of the bail will raise the rear of the pan, causing the front edge to lie closely to the floor, in which position the pan may be firmly held by standing on said loop 8, leaving the hands free to wield the broom in the operation of sweeping.

The handle 9 is mounted upon the inclined top portion 3 for the purpose of carrying the pan when it is desired to empty the dirt therefrom, said handle consisting of two opposed bowed pieces, preferably formed of spring wire standing approximately parallel to permit of the entrance of the handle of the broom 10 therebetween for the purpose of supporting the broom when the dust pan is hanging up, as shown by dotted lines in Fig. 2.

Having thus fully set forth my invention, what I claim as new and desire to secure by Letters Patent is:—

The combination with a dust pan having raised sides, of a lifting bail the major portion of which stands parallel with the back of the pan and which is provided with end portions curved in the arc of a circle, the terminals of said curved portions being bent inwardly to form hooks and said hooks engaging in the raised sides of the pan at the rear and just above the plane of the bottom, said bail having a centrally disposed rearwardly extending member which is tangent to the arc of the curved end portions.

In testimony whereof, I sign this specification in the presence of two witnesses.

AUGUSTUS W. SHANK.

Witnesses:
　E. S. WHEELER,
　I. G. HOWLETT.